United States Patent
Takizawa et al.

(10) Patent No.: US 7,345,099 B2
(45) Date of Patent: Mar. 18, 2008

(54) AQUEOUS INK FOR INK JET PRINTER RECORDING

(75) Inventors: Nobuyuki Takizawa, Wakayama (JP); Takehiro Tsutsumi, Wakayama (JP); Shigeki Nagashima, Wakayama (JP)

(73) Assignee: Kao Corporation, Tokyo (JP)

( * ) Notice: Subject to any disclaimer, the term of this patent is extended or adjusted under 35 U.S.C. 154(b) by 650 days.

(21) Appl. No.: 10/878,371

(22) Filed: Jun. 29, 2004

(65) Prior Publication Data

US 2005/0027036 A1 Feb. 3, 2005

(30) Foreign Application Priority Data

Jul. 4, 2003 (JP) .............................. 2003-191866

(51) Int. Cl.
*C08K 3/04* (2006.01)

(52) U.S. Cl. ..................... 523/160; 523/161; 523/200; 523/205; 106/31.6; 524/495; 524/496

(58) Field of Classification Search ................ 523/160, 523/161, 200, 205; 524/495, 496; 106/31.6
See application file for complete search history.

(56) References Cited

U.S. PATENT DOCUMENTS

| | | | | |
|---|---|---|---|---|
| 5,051,302 A | * | 9/1991 | Tsuyguchi et al. | ....... 428/32.61 |
| 5,705,555 A | * | 1/1998 | Guilfoy et al. | ............. 524/495 |
| 5,807,494 A | * | 9/1998 | Boes et al. | .................... 252/62 |
| 5,919,294 A | | 7/1999 | Hirasa et al. | |
| 6,468,636 B1 | * | 10/2002 | Hirano | .................... 428/32.69 |
| 7,112,619 B2 | * | 9/2006 | Sakakibara et al. | ......... 523/161 |
| 7,121,659 B2 | * | 10/2006 | Nagashima et al. | ........ 347/100 |
| 2005/0223938 A1 | * | 10/2005 | Tyvoll | ....................... 106/31.6 |

FOREIGN PATENT DOCUMENTS

| | | |
|---|---|---|
| EP | 0 354 293 | 2/1990 |
| EP | 0 704 503 | 4/1996 |
| EP | 1 243 623 | 9/2002 |
| JP | 05017704 A * | 1/1993 |
| JP | 6-306317 | 11/1994 |
| JP | 8-151544 | 6/1996 |
| JP | 8-176488 | 7/1996 |
| JP | 8-218015 | 8/1996 |
| JP | 10-17808 | 1/1998 |
| JP | 10-36727 | 2/1998 |
| JP | 2000-144031 | 5/2000 |
| JP | 2002-542368 | 12/2002 |
| JP | 2003020419 A * | 1/2003 |
| WO | WO 00/63306 | 10/2000 |

OTHER PUBLICATIONS

Machine Translation of JP 2003-020419 A (2003).*
Machine Translation of JP 05-017704 A (1993).*

* cited by examiner

*Primary Examiner*—Bernard Lipman
(74) *Attorney, Agent, or Firm*—Oblon, Spivak, McClelland, Maier & Neustadt, P.C.

(57) ABSTRACT

The present invention relates to an aqueous ink for ink jet printer recording including a water dispersion of water-insoluble vinyl polymer particles containing carbon black, wherein the carbon black has a volatile content of 5% or less at 950° C. and includes at least two kinds of carbon black differing from each other in at least one of a primary particle diameter, a specific surface area and a DBP absorption amount.

27 Claims, No Drawings

AQUEOUS INK FOR INK JET PRINTER RECORDING

FIELD OF THE INVENTION

The present invention relates to an aqueous ink for ink jet printer recording and to a method of producing an aqueous ink for ink jet printer recording.

BACKGROUND OF THE INVENTION

An ink jet recording system is a recording system in which ink liquid droplets are jetted directly on a recording member from very fine nozzles and made to adhere to the recording member to obtain characters and images. This system has not only the advantage that the device to be used has a low noise and good operability but also has the advantage that coloration is easy and common paper can be used as recording members and is therefore widely used. The water resistance and light fastness of printing products are regarded as important and there is an increased demand for pigment type inks as the ink used in ink jet printers these days.

However, it is known to be usually very difficult to disperse pigment type ink at a high density stably in water. In this situation, such technologies have been developed that dispersion stability is accomplished by adding a resin in ink or by allowing a pigment to be included in a resin emulsion. (JP-A 6-306317, JP-A 8-218015, JP-A 8-151544, JP-A8-176488 and JP-A2000-144031). This method, however, has the problem that optical density is decreased because of reduced content of a pigment in ink.

As pigment type inks using carbon black, those using so-called self-dispersible carbon black obtained by forming various hydrophilic functional groups on the surface of raw carbon black to disperse carbon black stably in water have been already known as described in JP-A 10-36727 as the pigment to solve this problem.

Also, techniques using carbon black having a high specific surface area to raise optical density are known as described in WO-A00/63306 and the equivalent JP-A 2002-542368. This discloses a production of self-dispersible ink.

JP-A 10-17808 and the equivalent U.S. Pat. No. 5,919,294 discloses an aqueous ink containing carbon having a specified DBP absorption amount.

SUMMARY OF THE INVENTION

The present invention relates to an aqueous ink for an ink jet printer recording, including a water dispersion of water-insoluble vinyl polymer particles containing carbon black, wherein the carbon black has a volatile content of 5% or less at 950° C. and includes at least two kinds of carbon black differing from each other in at least one of a primary particle diameter, a specific surface area and a DBP absorption amount.

The present invention also relates to use of the above shown aqueous ink for ink jet printer recording.

DETAILED DESCRIPTION OF THE INVENTION

Ink using a self-dispersible type carbon black has no binder component at all. Therefore, printed ink is not formed as a film, giving rise to the problem that the ink has very deteriorated fixing ability.

Also, ink using carbon black having a high specific surface area has a high viscosity, giving rise to the problem that the ink has deteriorated jetting ability, which does not lead to a large improvement in optical density.

The present invention relates to a pigment type ink jet recording aqueous type ink superior in water resistance and light fastness, the ink being able to achieve high optical density, satisfying various requirements at a high level and exhibiting high fixing ability.

The ink jet recording aqueous ink of the present invention has various abilities, such as high optical density on common paper and high fixing ability to special paper, required to use it properly as an ink jet recording aqueous ink.

In the aqueous ink for ink jet recording of the present invention, the term "aqueous" means that the ratio of water in all the solvents, contained in the ink, is the largest and the ratio of water may be 100%. A mixture of water and at least one organic solvent may be also included in the aqueous solvent insofar as it satisfies the above requirements.

The ink jet recording aqueous ink of the present invention contains a water dispersion of a water-insoluble vinyl polymer having carbon black.

There is no particular limitation to the particle structure of the water-insoluble vinyl polymer particles containing carbon black insofar as these particles are formed of at least carbon black and the water-insoluble vinyl polymer. Examples of the particle structure include a particle structure in which carbon black is included in the water-insoluble vinyl polymer, a particle structure in which the carbon black is uniformly dispersed in the water-insoluble vinyl polymer and a particle structure in which although carbon black is included in the water-insoluble vinyl polymer, a part of the carbon black is exposed from the surface of the particle.

(Carbon Black)

As the carbon black in the present invention, those which have been used in all applications and at all grades may be used. Specifically, besides carbon black for ink jet ink, carbon black used for general paints, carbon black for resin coloring, enforcing carbon black, ultraviolet protecting carbon black, conductive carbon black and the like may be all used. Also furnace black, thermal lamp black, lamp black, acetylene black, channel black, ketchene black and the like which are classes of carbon blacks by a production method.

The carbon black in the present invention is not preferably those which have been surface-treated by, for example, oxidizing treatment or a diazo coupling reaction. Specifically, the carbon black of the present invention is preferably those of which the decreased content (hereinafter called "volatile content") is 5% or less, preferably 4% or less and more preferably 3% or less when heated at 950° C. for a fixed time.

As aforementioned, the volatile content of 5% or less means that the degree of surface treatment of the surface of carbon black is low. When the carbon black is surface-treated, a highly hydrophilic carboxyl group, hydroxide group or sulfonic acid group is introduced.

The carbon black which has been surface-treated in this manner has a low affinity to the water-insoluble vinyl polymer and therefore impairs the stability of the water-insoluble vinyl polymer particles.

As the carbon black used in the present invention, a combination of at least two kinds differing in at least one of primary particle diameter, specific surface area and DBP absorption amount. Such a combination makes it possible to prepare an aqueous ink for ink jet printer recording meeting various requirements. These factors are measured by the methods described in the examples.

Examples of the combination of at least two kinds of carbon black include combinations of carbon blacks differing in any one, two (primary particle diameter and specific surface area. specific surface area and DBP absorption amount or DBP absorption amount and primary particle diameter) or three of primary particle diameter, specific surface area and DBP absorption amount. Two kinds or at least three kinds of carbon black may be used.

The specific surface area and DBP (dibutyl phthalate) absorption amount of carbon black can be measured according to a method of JIS K6217. The average primary particle diameter can be determined by measuring diameters with an electron microscope and calculating the average thereof per 100 pieces. The specific surface area is values obtained by BET method in the invention.

The average primary particle diameter of the carbon black is preferably 10 to 100 nm, more preferably 11 to 50 nm and more preferably 12 to 40 nm though there is no particular limitation to it.

Examples of the combination of at least two kinds of carbon black differing in the average primary particle diameter include a combination of carbon black having a large particle diameter and carbon black having a small particle diameter and a combination of carbon black having a particle diameter larger than a specified value and carbon black having a particle diameter less than a specified value (or a particle diameter exceeding a specified value and a particle diameter more than a specified value).

An example is a combination of carbon black (small particle diameter) having an average primary particle diameter of 12 nm or more and less than 20 nm and carbon black (large particle diameter) having an average primary particle diameter of 20 to 40 nm.

When two kinds of carbon black between differing in the primary particle diameter is used, the difference in the primary particle diameter is preferably 1 nm or more from the viewpoint of the purposes of the invention, more preferably 2 nm or more. The upper limit is not specifically made, but may be not more than 20 nm.

The specific surface area of the carbon black is preferably 50 to 2000 $m^2/g$, more preferably 50 to 400 $m^2/g$, even more preferably 60 to 380 $m^2/g$, even more preferably 65 to 370 $m^2/g$, though there is no particular limitation to it.

Examples of the combination of at least two kinds of carbon black differing in specific surface area include a combination of carbon black having a large specific surface area and carbon black having a small specific surface area and a combination of carbon black having a specific surface area larger than a specified value and carbon black having a specific surface area less than a specified value (or a specific surface area exceeding a specified value and a specific surface area smaller than a specified value).

Given as examples are a combination of carbon black (small specific surface area) having a specific surface area of 50 $m^2/g$ or more and less than 250 $m^2/g$ and carbon black (large specific surface area) having a specific surface area of 250 to 2000 $m^2/g$, a combination of carbon black (small specific surface area) having a specific surface area of 50 $m^2/g$ or more and less than 230 $m^2/g$ and carbon black (large specific surface area) having a specific surface area of 230 to 2000 $m^2/g$ and a combination of carbon black (small specific surface area) having a specific surface area of 65 $m^2/g$ or more and less than 140 $m^2/g$ and carbon black (large specific surface area) having a specific surface area of 140 to 370 $m^2/g$.

When two kinds of carbon black differing in the specific surface area are used, the difference in the specific surface area is preferably 10 $m^2/g$ or more from the viewpoint of the purposes of the invention, more preferably 20 $m^2/g$ or more, even more preferably 100 $m^2/g$ or more. The upper limit is not specifically made, but may be not more than 1400 $m^2/g$.

The DBP absorption amount of the carbon black is preferably 40 to 400 $cm^3/100$ g, more preferably 42 to 380 $cm^3/100$ g and even more preferably 45 to 370 $cm^3/100$ g, though there is no particular limitation to it.

Examples of the combination of at least two kinds of carbon black differing in DBP absorption amount include a combination of carbon black having a large DBP absorption amount and carbon black having a small DBP absorption amount and a combination of carbon black having a DBP absorption amount larger than a specified value and carbon black having a DBP absorption amount less than a specified value (or a DBP absorption amount exceeding a specified value and a DBP absorption amount smaller than a specified value).

Given as examples are a combination of carbon black (small DBP absorption amount) having a DBP absorption amount of 40 $cm^3/100$ g or more and less than 100 $cm^3/100$ g and carbon black (large DBP absorption amount) having a DBP absorption amount of 100 to 400 $cm^3/100$ g, a combination of carbon black (small DBP absorption amount) having a DBP absorption amount of 42 $cm^3/100$ g or more and less than 100 $cm^3/100$ g and carbon black (large DBP absorption amount) having a DBP absorption amount of 100 to 380 $cm^3/100$ g, and a combination of carbon black (small DBP absorption amount) having a DBP absorption amount of 45 $cm^3/100$ g or more and less than 100 $cm^3/100$ g and carbon black (large DBP absorption amount) having a DBP absorption amount of 100 to 370 $cm^3/100$ g.

When two types of carbon black differing in DBP absorption amount are used, it is desirable to use two types of carbon black differing in DBP absorption amount preferably by 45 $cm^3/100$ g or more, more preferably by 70 $cm^3/100$ g or more, preferably by 300 $cm^3/100$ g or less, from the viewpoint of attaining the object of the present invention.

When two types of carbon black differing in DBP absorption amount are used, it is preferable to contain carbon black having a DBP absorption amount of 170 $cm^3/100$ g or more, more preferably 170 to 400 $cm^3/100$ g even more preferably 170 to 380 $cm^3/100$ g, even more preferably 170 to 370 $cm^3/100$ g; and it is more preferable to contain carbon black having a DBP absorption amount of 200 $cm^3/100$ g or more, more preferably 200 to 400 $cm^3/100$ g even more preferably 200 to 380 $cm^3/100$ g, even more preferably 200 to 370 $cm^3/100$ g from the viewpoint of attaining the object of the present invention.

When combining two types of carbon black differing in at least one of primary particle diameter, specific surface area and DBP absorption amount, the compounding ratio (by weight) of these types of carbon black is preferably 95/5 to 5/95.

(Water-insoluble Vinyl Polymer)

Examples of the water-insoluble vinyl polymer include those obtained by copolymerizing (A) a nonionic hydrophilic monomer with (B) a salt-forming group-containing monomer and also those obtained by further copolymerizing (C) a monomer copolymerizable with the above monomers. It is to be noted that other monomers may be used within the range in which the object of the present invention can be attained.

As the monomer (A), those represented by the following formula are preferable. Monomers having an oxyethylene unit, oxypropylene unit or oxytetramethylene unit as an oxyalkylene structure unit are preferable. p means the average added mole number and is preferably 2 to 25.

In the formula, AO represents an oxyalkylene unit (provided that p oxyalkylene units may be the same or different) having 2 to 4 carbon atoms. When these oxyalkylene units are different from each other, the addition of these units may be any one of block addition, random addition and alternate addition. $R^1$ represents a hydrogen or a methyl group, p denotes a number from 1 to 50, $R^2$ represents a hydrogen atom, an alkyl group having 1 to 20 carbon atoms or a phenyl group which may be substituted with an alkyl group having 1 to 9 carbon atoms.

Examples of nonionic and hydrophilic monomer include a polyethylene glycol mono(meth)acrylate, polypropylene glycol mono(meth)acrylate, ethylene glycol.propylene glycol (meth)acrylate, poly(ethylene glycol.propylene glycol) mono(meth)acrylate, octoxypolyethylene glycol.polypropylene glycol) mono(meth)acrylate, octoxypoly(ethylene glycol.propylene glycol) mono(meth)acrylate, stearoxypolyethylene glycol.polypropylene glycol) mono(meth)acrylate, stearoxypoly(ethylene glycol.propylene glycol) mono(meth)acrylate, nonylphenoxypolyethylene glycol.polypropylene glycol mono(meth)acrylate, nonylphenoxypoly(ethylene glycol.propylene glycol mono(meth)acrylate, propylene glycol.tetramethylene glycol mono(meth)acrylate, poly(propylene glycol.tetramethylene glycol) mono (meth)acrylate, propylene glycol.polybutylene glycol mono (meth)acrylate and poly(propylene glycol.butylene glycol) mono(meth)acrylate. These compounds may be used either singly or by mixing two or more. It is to be noted that the term "(meth)acrylate" includes a methacrylate and an acrylate.

Specific examples of commercially available nonionic and hydrophilic monomer include NK Ester M-20G, 40G, 90G and 230G manufactured by Shin-Nakamura Chemical Co., Ltd. and Blenmer PE Series PME-100, 200, 400, 1000, PP-1000, PP-500, PP-800, AP-150, AP-400, AP-550, AP-800, 50PEP-300, 70PEP-350B, AEP Series, 30PPT-800, 50PPT-800, 70PPT-800, APT Series, 10PPB-500B, 10APB-500B, 50POEP-800B, 50AOEP-800B, ASEP Series, PNEP Series, PNPE Series, 43ANEP-500 and 70ANEP-550 manufactured by NOF CORPORATION.

As the salt-forming group-containing monomer (B), anionic monomers and cationic monomers are preferable. These anionic and cationic monomers maybe respectively used either singly or by mixing two or more.

Examples of the anionic monomer include at least one type selected from the group consisting of unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. These compounds may be used either singly or by mixing two or more.

Examples of the unsaturated sulfonic acid monomer include styrenesulfonic acid, 2-acrylamido-2-methylpropanesulfonic acid, 3-sulfopropyl(meth)acrylate and bis-(3-sulfopropyl)-itaconate. These compounds may be used either singly or by mixing two or more.

Examples of the unsaturated phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate. These compounds may be used either singly or by mixing two or more.

Among these anionic monomers, unsaturated carboxylic acid monomers are preferable and acrylic acids and methacrylic acids are more preferable from the viewpoint of ink viscosity and jetting ability.

Examples of the cationic monomer include at least one type selected from unsaturated tertiary amine-containing vinyl monomers and unsaturated ammonium salt-containing vinyl monomers.

Examples of the unsaturated tertiary amine-containing monomer include N,N-dimethylaminoethyl(meth)acrylate, N,N-dimethylaminopropyl(meth)acrylate, N,N-diethylaminoethyl(meth)acrylate, N,N-dimethylaminopropyl(meth) acrylamide, N,N-dimethylarylamine, vinyl pyrrolidone, 2-vinylpyridine, 4-vinylpyridine, 2-methyl-6-vinylpyridine and 5-ethyl-2-vinylpyridine. These compounds may be used either singly or by mixing two or more.

Examples of the unsaturated ammonium salt-containing monomer include N,N-dimethylaminoethyl(meth)acrylate quaternary compounds, N,N-diethylaminoethyl(meth)acrylate quaternary products and N,N-dimethylaminopropyl (meth)acrylate quaternary products. These compounds may be used either singly or by mixing two or more.

Among these cationic monomers, N,N-dimethylaminoethyl(meth)acrylate, N,N-dimethylaminopropyl (meth) acrylamide and vinyl pyrrolidone are preferable.

Examples of the copolymerizable monomer (C) include alkyl(meth)acrylates, aromatic ring-containing monomers and macromonomers. These monomers may be used either singly or by mixing two or more. The copolymerizable monomer preferably contains at least one type selected from the group consisting of aromatic ring-containing monomers and macromonomers from the viewpoint of water resistance and scratch resistance.

Examples of the alkyl(meth)acrylate include (meth)acrylates of which the ester part is an alkyl group having 1 to 18 carbon atoms such as methyl(meth)acrylate, ethyl(meth) acrylate, (iso)propyl(meth)acrylate, (iso or tertiary)butyl (meth)acrylate, (iso)amyl(meth)acrylate, cyclohexyl(meth) acrylate, 2-ethylhexyl(meth)acrylate, (iso)octyl(meth) acrylate, (iso)decyl(meth)acrylate (iso)dodecyl(meth) acrylate and (iso)stearyl(meth)acrylate. These compounds may be used either singly or by mixing two or more.

It is to be noted that the aforementioned (iso or tertiary) and (iso) means both the case where these groups are present and the case where these groups are not present. The case where these groups are not present means normal.

The aromatic ring-containing monomer is preferably a vinyl monomer having an aromatic hydrocarbon group having 6 to 22 carbon atoms, more preferably at least one selected from styrene, vinylnaphthalene, α-methylstyrene, vinyltoluene, ethylvinylbenzene, 4-vinylbiphenyl, 1,1-diphenylethylene, benzyl(meth)acrylate, phenoxyethyl (meth)acrylate, 2-hydroxy-3-phenoxypropylacrylate, 2-methacryloyloxyethyl-2-hydroxypropylphthalate, 2-acryloyloxyethylphthalic acid and neopentyl glycol acrylic acid benzoate from the viewpoint of water resistance. Among these compounds, at least one type selected from the group consisting of styrene, α-methylstyrene, vinyltoluene and vinylnaphthalene is more preferable from the viewpoint of water resistance and scratch resistance.

The macromonomer in the present invention means polymers having a polymerizable functional group at one terminal and a number average molecular weight of 500 to 500,000 and more preferably 1,000 to 10,000.

Specific examples of the macromonomer include styrene type macromonomers having a polymerizable functional group at one terminal, silicone type macromonomers having a polymerizable functional group at one terminal, methylmethacrylate type macromonomers having a polymerizable functional group at one terminal, styrene/acrylonitrile type macromonomers having a polymerizable functional group at one terminal, butylacrylate type macromonomers having a polymerizable functional group at one terminal and isobutylmethacrylate type macromonomers having a polymerizable functional group at one terminal. Among these macromonomers, styrene type macromonomers having a polymerizable functional group at one terminal are preferable from the viewpoint of making the water-insoluble vinyl polymer contain carbon black sufficiently.

Examples of the styrene type macromonomers having a polymerizable functional group at one terminal include styrene homopolymers having a polymerizable functional group at one terminal and copolymers of styrene having a polymerizable functional group at one terminal and other monomers.

In these copolymers of styrene having a polymerizable functional group at one terminal and other monomers, examples of these other monomers include acrylonitrile. Also, the content of styrene is preferably 60% by weight or more and more preferably 70% by weight or more from the viewpoint of making the water-insoluble vinyl polymer contain carbon black sufficiently.

Among these styrene type macromonomers having a polymerizable functional group at one terminal, styrene type macromonomers having an acryloyloxy group or a methacryloyloxy group as the polymerizable functional group at one terminal are preferable.

Examples of commercially available styrene type macromonomers include AS-6, AS-6S, AN-6, AN-6S, HS-6 and HS-6S manufactured by Toagosei Co., Ltd.

Among silicone macromers, silicone macromers represented by the formula (I) are preferable from the viewpoint of preventing scorching of the head of an ink jet printer.

In the formula, X represents a polymerizable unsaturated group, Y represents a divalent connecting group, $R^3$s respectively represent a hydrogen atom, a lower alkyl group, an aryl group or an alkoxy group, Z represents the residue of a monovalent siloxane polymer having a number average molecular weight of 500 or more, q denotes a number of 0 or 1 and r denotes an integer from 1 to 3.

In the silicone macromers represented by the formula (I), X is a polymerizable unsaturated group as mentioned above. Typical examples of X include monovalent unsaturated hydrocarbon groups having 2 to 6 carbon atoms such as $CH_2$=CH— and $CH_2$=C($CH_3$)—.

Y represents a divalent connecting group as mentioned above. Typical examples of Y include divalent connecting group such as —COO—, —COO($CH_2$)$_a$— (where a denotes an integer from 1 to 5) and a phenylene group. Among these groups, —COOC$_3$H$_6$— is preferable.

$R^3$s respectively represent a hydrogen atom, a lower alkyl group, an aryl group or an alkoxy group as mentioned above. Typical examples of $R^3$ include a hydrogen atom; lower alkyl groups having 1 to 5 carbon atoms such as a methyl group and ethyl group; aryl groups having 6 to 20 carbon atoms such as a phenyl group; and alkoxy groups having 1 to 20 carbon atoms such as a methoxy group. Among these groups, a methyl group is preferable.

Z represents the residue of a monovalent siloxane polymer having a number average molecular weight of 500 or more as mentioned above. Preferable examples of Z include the residues of dimethyl siloxane polymers having a number average molecular weight of 500 to 5000.

q denotes a number of 0 or 1 and preferably 1. r denotes an integer from 1 to 3 and more preferably 1.

Typical examples of the silicone macromers include silicone macromers represented by the following formula (II), (III), (IV) or (V).

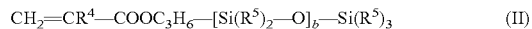

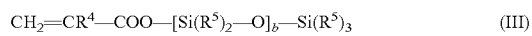

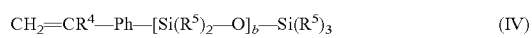

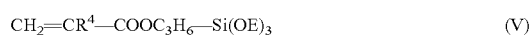

Each symbol in the formula is as follows.

$R^4$: represents a hydrogen atom or a methyl group.

$R^5$s: respectively represent a hydrogen atom or a lower alkyl group having 1 to 5 carbon atoms.

b: denotes a number from 5 to 60.

Ph: represents a phenylene group.

E: represents a —[Si($R^4$)$_2$—O]$_c$—Si($R^4$)$_3$ group (where $R^4$ is the same as above and c denotes a number of 5 to 65).

Among these groups, silicone macromers represented by the formula (II) are preferable and particularly, silicone macromers represented by the following formula (II-1) are preferable.

In the formula, d denotes a number of 8 to 40. Specific examples of the silicone macromer include FM-0711 (trade name, manufactured by Chisso Corporation).

The number average molecular weight of the macromonomer is measured by gel chromatography using 1 mmol/L of dodecyldimethylamine-containing chloroform as a solvent and polystyrene as a standard material.

The content (based on raw material) of the nonionic and hydrophilic monomer (A) in the water-insoluble vinyl polymer is preferably 5 to 45% by weight, more preferably 5 to 35% by weight and even more preferably 5 to 30% by weight from the viewpoint of optical density, glossiness of a print product and high optical density.

The content (based on raw material) of the salt-forming group-containing monomer (B) in the water-insoluble vinyl polymer is preferably 3 to 40% by weight, more preferably 5 to 30% by weight and even more preferably 6 to 25% by weight from the viewpoint of dispersion stability and jetting stability.

The content (based on raw material) of the copolymerizable monomer (C) in the water-insoluble vinyl polymer is preferably 15 to 87% by weight, more preferably 35 to 85% by weight and even more preferably 30 to 83% by weight from the viewpoint of optical density and water resistance.

When an aromatic ring-containing monomer is used as the copolymerizable monomer (C), the content of the aromatic ring-containing monomer in the copolymerizable monomer (C) is preferably 0.1 to 70% by weight, more preferably 1 to 65% by weight and even more preferably 2 to 60% by weight from the viewpoint of water resistance, scratch resistance, ink viscosity and jetting stability.

When a macromonomer is used as the copolymerizable monomer (C), the content of the macromer in the copolymerizable monomer (C) is preferably 0.1 to 40% by weight, more preferably 1 to 30% by weight and even more preferably 3 to 25% by weight from the viewpoint of water resistance and scratch resistance.

The weight average molecular weight of the water-insoluble vinyl polymer is preferably 3,000 to 300,000 and more preferably 5,000 to 200,000 from the viewpoint of optical density and jetting stability.

The water-insoluble vinyl polymer is produced by polymerizing a monomer composition by a known polymerization method such as a block polymerization method, solution polymerization method, suspension polymerization method and emulsion polymerization method. Among these polymerization methods, a solution polymerization method is preferable.

The solvent used in the solution polymerization method is preferably a polar organic solvent. In the case where the polar organic solvent is miscible with water, it may be mixed with water when used.

Examples of the polar organic solvent include aliphatic alcohols having 1 to 3 carbon atoms such as methanol, ethanol and propanol; ketones such as acetone and methyl ethyl ketone; and esters such as ethyl acetate. Among these compounds, methanol, ethanol, acetone, methyl ethyl ketone or mixed solutions of these solvents and water are preferable.

When the polymerization is carried out, a radical initiator may be used. As the radical initiator, azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis(1-cyclohexanecarbonitrile) are preferable. Also, organic peroxides such as t-butyl peroxyoctoate, di-t-butyl peroxide and dibenzoyl oxide may be used.

The amount of the initiator is preferably 0.001 to 5 mol and more preferably 0.01 to 2 mol per 1 mol of the monomer mixture.

In the polymerization, a chain transfer agent may be further added. Specific examples of the chain transfer agent include mercaptans such as octylmercaptan, n-dodecylmercaptan, t-dodecylmercaptan, n-tetradecylmercaptan, stearylmercaptan, thioglycerol and 2-mercaptoethanol; xanthogen disulfides such as dimethylxanthogen disulfide and diisopropylxanthogen disulfide; thiuram disulfides such as tetramethylthiuram disulfide and tetrabutylthiuram disulfide; hydrocarbon halides such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, turbinolene, α-terpinene, γ-terpinene, dipentene, α-methylstyrene dimer, 9,10-dihydroanthracene, 1,4-dihydronaphthalene, indene and 1,4-cyclohexadiene; and unsaturated heterocyclic compounds such as 2,5-dihydrofuran. These polymerization chain transfer agents may be used either singly or by mixing two or more.

The condition under which the monomer is polymerized differs depending on, for example, types of radical initiator, monomer and solvent to be used and is therefore not determined in a wholesale manner. Generally, the polymerization temperature is preferably 30 to 100° C. and more preferably 50 to 80° C. and the polymerization time is preferably 1 to 20 hours. The polymerization atmosphere is preferably an atmosphere of inert gas such as nitrogen gas.

After the polymerization reaction is finished, the produced water-insoluble vinyl polymer may be isolated from the reaction solution by a known method such as reprecipitation and distillation of a solvent. The obtained water-insoluble vinyl polymer may be purified by repeating reprecipitation or by removing unreacted monomers and the like by means of membrane separation, a chromatographic method or an extraction method.

The solubility of the water-insoluble vinyl polymer at 25° C. in water after the salt-forming group is neutralized to 100% with sodium hydroxide or acetic acid, depending on the kind of the salt-forming group, is preferably 15% by weight or less, more preferably 10% by weight or less, even more preferably 5% by weight or less, even more preferably 1% by weight or less from the viewpoint of making the aqueous ink have a low viscosity.

(Ink Jet Recording Aqueous Ink)

The ink jet recording aqueous ink of the present invention may be prepared, for example, in the following manner: the water-insoluble vinyl polymer is dissolved in an organic solvent and specific carbon black, water, a neutralizing agent and, according to the need, a surfactant are added and mixed. Then, the mixture was diluted with water according to the need and the organic solvent is removed to obtain a water dispersion of the water-insoluble vinyl polymer containing carbon black. Then, a wetting agent, dispersant, antifoaming agent, mildew proofing agent, chelating agent and the like are added according to the need. The amount of water in the aqueous ink is preferably 40 to 90% by weight.

When the ink jet recording aqueous type ink is prepared, at least two kinds of carbon black may be added simultaneously or aqueous inks containing each carbon black and prepared separately may be compounded. Also, in the case of preparing aqueous inks having each carbon black separately, they may be prepared under each separate condition, for example, the condition that different types of water-insoluble vinyl polymer are used.

There is no limitation to the mixing method. Known mixing methods such as a mechanical mixing method using a beads mill or a roll mill, a mixing method under high pressure such as a high pressure homogenizer and a mixing method using supersonic wave may be combined optionally when used.

As the organic solvent, alcohol type solvents, ketone type solvents and ether type solvents are preferable. Among these solvents, hydrophilic organic solvents are more preferable.

Examples of the alcohol type solvent include methanol, ethanol, isopropanol, n-butanol, tertiary butanol, isobutanol and diacetone alcohol and the like.

Examples of the ketone type solvent include acetone, methyl ethyl ketone, diethyl ketone and methyl isobutyl ketone. Examples of the ether type include dibutyl ether, tetrahydrofuran and dioxane. Among these solvents, isopropanol, acetone and methyl ethyl ketone are preferable.

Also, according to the need, the aforementioned organic solvent may be combined with a high-boiling point hydrophilic organic solvent. Examples of the high-boiling point hydrophilic organic solvent include phenoxy ethanol, ethylene glycol monomethyl ether, diethylene glycol monomethyl ether, diethylene glycol monoethyl ether and diethylene glycol diethyl ether and the like.

As the neutralizing agent, an acid or a base may be used corresponding to the type of salt-forming group. Examples of the acid include inorganic acids such as hydrochloric acid and sulfuric acid and organic acids such as acetic acid, propionic acid, lactic acid, succinic acid, glycolic acid, gluconic acid and glyceric acid. Examples of the base include tertiary amines such as trimethylamine and triethylamine, ammonia, sodium hydroxide and potassium hydroxide.

There is no particular limitation to the degree of neutralization. Generally, the resulting water dispersion is preferably in a range from a weakly acidic state to a weakly alkaline state, for example, in a pH range from 4 to 10.

Examples of the wetting agent include polyhydric alcohols or their ethers such as ethylene glycol, propylene glycol, diethylene glycol, triethylene glycol, polyethylene glycol, glycerin, diethylene glycol diethyl ether and diethylene glycerin mono-n-butyl ether, acetates, N-methyl-2-pyrrolidone and nitrogen-containing compounds such as 1,3-dimethylimidazolidinone. The amount of the wetting agent in the aqueous ink is preferably 0.1 to 50% by weight and more preferably 0.1 to 30% by weight.

As the dispersant, an anionic, nonionic, cationic or amphoteric dispersant may be used.

The amount of the carbon black is preferably 20 to 1200 parts by weight and more preferably 50 to 900 parts by weight based on 100 parts by weight of the water-insoluble vinyl polymer from the viewpoint of optical density and with the view of easily compounding it in the polymer particles.

The amount (solid content) of the water-dispersion in the water-insoluble vinyl polymer particles containing carbon black in the aqueous ink is adjusted to preferably 0.5 to 30% by weight, more preferably 1 to 20% by weight and even more preferably 2 to 15% by weight.

The average particle diameter of the water-insoluble vinyl polymer particles containing carbon black is preferably 0.01 to 0.50 μm, more preferably 0.02 to 0.30 μm and even more preferably 0.04 to 0.20 μm from the viewpoint of preventing the clogging of nozzles and dispersion stability. Here, the average particle diameter of the polymer particles is measured using a Laser Particle Analysis System ELS-8000 (Cumulant method) manufactured by Otsuka Electronics Co., Ltd.

The ink jet recording aqueous ink in the present invention preferably contains at least two types of carbon black differing in DBP absorption amount by 45 $cm^3/100$ g or more. The inkjet recording aqueous ink containing these two types of carbon black can exhibit very high optical density. At this time, it is preferable to contain carbon black having a DBP absorption amount of 170 $cm^3/100$ g or more in an amount of 5 to 95% by weight of the total carbon black in the aqueous ink from the viewpoint of obtaining high optical density and decreasing viscosity.

EXAMPLES

Synthetic Example 1

Synthesis of a Water-insoluble Vinyl Polymer 10 parts by weight of methyl ethyl ketone, 0.03 parts by weight of 2-mercaptoethanol, 2.5 parts by weight of polypropylene glycol monomethacrylate, 3 parts by weight of a styrene macromonomer, 4.6 parts by weight of styrene monomer and 1.4 parts by weight of methacrylic acid were placed in a reactor and mixed. The atmosphere in the reactor was replaced sufficiently by nitrogen gas to obtain a mixed solution.

In the meantime, 0.27 parts by weight of 2-mercaptoethanol, 22.5 parts by weight of polypropylene glycol monomethacrylate, 27 parts by weight of styrene macromonomer, 41.4 parts by weight of styrene monomer, 12.6 parts by weight of methacrylic acid, 50 parts by weight of methyl ethyl ketone and 1.2 parts by weight of 2,2'-azobis(2,4-dimethylvaleronitrile) were placed in a dropping funnel and mixed, and the atmosphere in the dropping funnel was replaced sufficiently by nitrogen gas to obtain a mixed solution.

The mixed solution in the reactor was raised to 75° C. with stirring in a nitrogen atmosphere and the mixed solution in the dropping funnel was gradually dripped in the reactor over 3 hours. A solution obtained by dissolving 0.3 parts by weight of 2,2'-azobis(2,4-dimethylvaleronitrile in 5 parts by weight of methyl ethyl ketone was added to the mixed solution when 2 hours passed after the dripping was finished, and the mixed solution was further ripened at 75° C. for 2 hours. Then, a solution obtained by dissolving 0.3 parts by weight of 2,2-azobis(2,4-dimethylvaleronitrile) in 5 parts by weight of methyl ethyl ketone was added and the resulting mixture was then further ripened at 80° C. for 1 hour to obtain a polymer solution.

A part of the resulting polymer solution was dried at 105° C. under reduced pressure for 2 hours to remove solvents. The weight average molecular weight of the polymer was measured by gel permeation chromatography using a polystyrene as a standard material and 1 mmol/L of dodecyldimethylamine-containing chloroform as a solvent. As a result, the weight average molecular weight of the polymer was 55,000.

The details of each compound used to synthesize the water-insoluble vinyl polymer are as follows;

Polypropylene glycol monomethacrylate: A reagent manufactured by Aldrich Corporation (number average molecular weight: 375).

Styrene macromer: Trade name: AS-6S, solid content: 50% by weight, manufactured by Toagosei Co., Ltd., number average molecular weight: 6000.

Styrene monomer: A reagent manufactured by Wako Pure Chemical Industries, Ltd., the highest quality.

Methacrylic acid: A reagent manufactured by Wako Pure Chemical Industries, Ltd., the highest quality.

Production Example 1

15 Parts by weight of a polymer obtained by drying the polymer solution obtained in Synthetic Example 1 under reduced pressure was dissolved in 25 parts by weight of methyl ethyl ketone. 3.48 Parts by weight of a neutralizing agent (aqueous 5N-sodium hydroxide solution) was added to the solution to neutralize a part of the salt-forming group. Further, 7.5 parts by weight of carbon black, BLACK PEARLS 2000 (primary particle diameter: 12 nm, specific surface area: 1500 $m^2/g$, DBP absorption amount: 330 $cm^3/100$ g) manufactured by Cabot and 7.5 parts by weight of carbon black, MONARCH 1100 (primary particle diameter: 14 nm, specific surface area: 240 $m^2/g$, DBP absorption amount: 65 $cm^3/100$ g) manufactured by Cabot were added. Then, 300 parts by weight of ion exchange water was added to the mixture, which was then emulsified for 30 minutes by using a microfluidizer (manufactured by Microfluidics).

120 Parts by weight of ion exchange water was added to the resulting kneaded product, which was then stirred. Then, methyl ethyl ketone was removed at 70° C. under reduced pressure and a part of water was further removed to obtain a water-insoluble vinyl polymer water dispersion 1 having a solid concentration of 20% by weight and containing carbon black.

Production Example 2

The same procedures as in Production Example 1 were carried out except that 7.5 parts by weight of carbon black, MONARCH 880 (primary particle diameter: 16 nm, specific surface area: 220 m²/g, DBP absorption amount: 112 cm³/100 g) manufactured by Cabot in place of 7.5 parts by weight of carbon black, BLACK PEARLS 2000 was used, to obtain a water-insoluble vinyl polymer water dispersion 2 having a solid concentration of 20% by weight and containing carbon black.

Production Example 3

The same procedures as in Production Example 1 were carried out except that 15 parts by weight of carbon black, MONARCH 880 (primary particle diameter: 16 nm, specific surface area: 220 m²/g, DBP absorption amount: 112 cm³/100 g) manufactured by Cabot in place of 7.5 parts by weight of carbon black, BLACK PEARLS 2000 and 7.5 parts by weight of carbon black, MONARCH 1100 was only used, to obtain a water-insoluble vinyl polymer water dispersion 3 having a solid concentration of 20% by weight and containing carbon black.

Production Example 4

The same procedures as in Production Example 1 were carried out except that 15 parts by weight of carbon black, MONARCH 1100 (primary particle diameter: 14 nm, specific surface area: 240 m²/g, DBP absorption amount: 65 cm³/100 g) manufactured by Cabot in place of 7.5 parts by weight of carbon black, BLACK PEARLS 2000 and 7.5 parts by weight of carbon black, MONARCH 1100 was only used, to obtain a water-insoluble vinyl polymer water dispersion 4 having a solid concentration of 20% by weight and containing carbon black.

Production Example 5

The same procedures as in Production Example 1 were carried out except that 15 parts by weight of carbon black, BLACK PEARLS 2000 (primary particle diameter: 12 nm, specific surface area: 1500 m²/g, DBP absorption amount: 330 cm³/100 g) manufactured by Cabot in place of 7.5 parts by weight of carbon black, BLACK PEARLS 2000 and 7.5 parts by weight of carbon black, MONARCH 1100 was only used, to obtain a water-insoluble vinyl polymer water dispersion 5 having a solid concentration of 20% by weight and containing carbon black.

Example 1

24.7 part by weight of the water dispersion 1 (solid content: 20% by weight) obtained in Production Example 1, 10 parts by weight of glycerin, 7 parts by weight of triethylene glycol monobutyl ether, 1 part by weight of Surfinol 465 (manufactured by Air Products and Chemicals, Inc.), 0.3 parts by weight of Proxel XL2 (S) (manufactured by AVECIA Corporation) and 58 parts by weight of ion exchange water were mixed. The resulting mixed solution was filtered by a needle-less syringe (manufactured by Terumo Corporation) having a capacity of 25 ml and equipped with a 5 µm filter (acetyl cellulose film, outside diameter: 2.5 cm, manufactured by Fuji Photo Film Co., Ltd.) to remove coarse particles, thereby obtaining an ink jet recording aqueous ink 1.

Example 2

An ink jet recording aqueous ink 2 was obtained in the same manner as in Example 1 except that 24.7 parts by weight of the water dispersion 2 (solid content: 20% by weight) obtained in Production Example 2 was used in place of the water dispersion 1 obtained in Production Example 1.

Comparative Example 1

A comparative aqueous ink 1 was obtained in the same manner as in Example 1 except that 24.7 parts by weight of the carbon black water dispersion 3 (solid content: 20% by weight) obtained in Production Example 3 was used in place of the water dispersion 1 obtained in Production Example 1.

Comparative Example 2

A comparative aqueous ink 2 was obtained in the same manner as in Example 1 except that 24.7 parts by weight of the carbon black water dispersion 4 (solid content: 20% by weight) obtained in Production Example 4 was used in place of the water dispersion 1 obtained in Production Example 1.

Comparative Example 3

A comparative aqueous ink 3 was obtained in the same manner as in Example 1 except that 24.7 parts by weight of the carbon black water dispersion (solid content: 20% by weight) obtained in Production Example 5 was used in place of the water dispersion 1 obtained in Production Example 1.

Next, the properties of the obtained aqueous ink were evaluated based on the following methods. The results are shown in Table 1.

(1) Viscosity

The viscosity of each ink was measured at 20° C. using an RE80L type viscometer (Rotor 1) manufactured by Toki Sangyo (K.K.) at 100 r/min and evaluated according to the following evaluation standard.

(Evaluation Standard)

⊙: The viscosity of ink is less than 3.5 mPa·s.

○: The viscosity of ink is 3.5 mPa·s or more and less than 4.5 mPa·s.

Δ: The viscosity of ink is 4.5 mPa·s or more and less than 7.0 mPa·s.

x: The viscosity of ink is 7.0 mPa·s or more (2) Jetting Ability

The jetting ability of each ink was evaluated using a bubble jet (R) printer (Model number: Desk Jet-720C) manufactured by HEWLETT PACKARD according to the following evaluation standard.

(Evaluation Standard)

○: All nozzles jet well.

Δ: A part of nozzles are inferior in jetting.

x: All nozzles are inferior in jetting.

(3) Optical Density

The above printer was used to carry out solid image printing on a commercially available common paper (XEROX 4200), which was then allowed to stand at 25° C. for 1 hour. Then, the optical density was measured by a Macbeth densitometer (Product Number: RD914, manufactured by Macbeth) and evaluated based on the following evaluation standard.

(Evaluation Standard)
- ⊙: Optical density is 1.2 or more.
- ○: Optical density is 1.1 or more and less than 1.2.
- Δ: Optical density is 1.0 or more and less than 1.1.
- x: Optical density is less than 1.0.

(4) Fixing Ability

The aforementioned printer was used to carry out solid printing on a commercially available paper for ink jet private use (PM photographic paper manufactured by Seiko Epson Corporation) and the paper was then dried at 25° C. for 24 hours. Thereafter, the print surface was strongly rubbed by a finger. The condition of the removal of the print image was evaluated based on the following evaluation standard.

(Evaluation Standard)
- ⊙: Print image is not removed at all.
- ○: Almost no print image is removed and any place around the print image is not soiled.
- Δ: Print image is removed a little and places around the print image and fingers are soiled a little.
- x: Print image is considerably removed and places around the print image and fingers are soiled considerably.

TABLE 1

|  | Example | | Comparative Example | | |
|---|---|---|---|---|---|
|  | 1 | 2 | 1 | 2 | 3 |
| Ink composition | | | | | |
| Kind of water dispersion of Production Examples | Production Example 1 | Production Example 2 | Production Example 3 | Production Example 4 | Production Example 5 |
| Kind of carbon black | BLACK PEARLS 2000 MONARCH 1100 | MONARCH 880 MONARCH 1100 | MONARCH 880 | MONARCH 1100 | BLACK PEARLS 2000 |
| Amount of water dispersion of production example | 24.7 | 24.7 | 24.7 | 24.7 | 24.7 |
| Glycerin | 10 | 10 | 10 | 10 | 10 |
| Triethylene glycol monobutyl ether | 7 | 7 | 7 | 7 | 7 |
| Therphinol 465 | 1 | 1 | 1 | 1 | 1 |
| Ploxel XL2 | 0.3 | 0.3 | 0.3 | 0.3 | 0.3 |
| Ion exchange water | 58 | 58 | 58 | 58 | 58 |
| Measuring items | | | | | |
| Viscosity | ○ | ⊙ | Δ | ⊙ | x |
| Jetting ability | ○ | ○ | ○ | ○ | x |
| Optical density | ⊙ | ○ | ○ | x | Δ |
| Fixing ability | ○ | ⊙ | Δ | ⊙ | x |

The number is represented as parts by weight.

As shown by the results in Table 1, it was found that all the aqueous inks obtained in Examples are low viscosity inks and are therefore superior in jetting ability. It is also found that the aqueous ink obtained in Example 1 forms a print product having a high optical density on a common paper. Also, it is also found that the aqueous ink obtained in Example 2 imparts practically sufficient optical density on a common paper and a print product superior in fixing ability on a paper for private use.

The invention claimed is:

1. An aqueous ink for ink jet printer recording, comprising a water dispersion of water-insoluble vinyl polymer particles comprising carbon black, wherein the carbon black has a volatile content of 5% or less at 950° C. and comprises at least two kinds of carbon black differing from each other in at least one of a primary particle diameter, a specific surface area and a DBP absorption amount.

2. The aqueous ink according to claim 1, wherein the water-insoluble vinyl polymer is obtained by polymerizing (A) a nonionic hydrophilic monomer, (B) a salt-forming group-contained monomer and (C) a monomer copolymerizable with the monomers (A) and (B).

3. The aqueous ink according to claim 1, comprising two kinds of carbon black between which the difference in DBP absorption amount is 45 $cm^3/100$ g or more.

4. The aqueous ink according to claim 1, comprising carbon black having a DBP absorption amount of at least 170 $cm^3/100$ g or more.

5. The aqueous ink according to claim 1, wherein at least one of the kinds of carbon black has a DBP absorption amount of at least 170 $cm^3/100$ g or more and an average particle diameter of 10 to 100 nm.

6. The aqueous ink according to claim 1, comprising two kinds of carbon black between which the difference in the primary particle diameter is 1 nm or more.

7. The aqueous ink according to claim 1, comprising two kinds of carbon black between which the difference in the specific surface area is 10 $m^2/g$ or more.

8. The aqueous ink according to claim 2, comprising carbon black having a DBP absorption amount of at least 170 $cm^3/100$ g or more.

9. The aqueous ink according to claim 3, comprising carbon black having a DBP absorption amount of at least 170 $cm^3/100$ g or more.

10. The aqueous ink according to claim 2, wherein at least one of the kinds of carbon black has a DBP absorption amount of at least 170 $cm^3/100$ g or more and an average particle diameter of 10 to 100 nm.

11. The aqueous ink according to claim 3, wherein at least one of the kinds of carbon black has a DBP absorption amount of at least 170 $cm^3/100$ g or more and an average particle diameter of 10 to 100 nm.

12. The aqueous ink according to claim 4, wherein at least one of the kinds of carbon black has a DBP absorption amount of at least 170 $cm^3/100$ g or more and an average particle diameter of 10 to 100 nm.

13. The aqueous ink according to claim 2, comprising two kinds of carbon black between which the difference in DBP absorption amount is 45 cm$^3$/100 g or more.

14. The aqueous ink according to claim 13, comprising carbon black having a DBP absorption amount of at least 170 cm$^3$/100 g or more.

15. The aqueous ink according to claim 13, wherein at least one of the kinds of carbon black has a DBP absorption amount of at least 170 cm$^3$/100 g or more and an average particle diameter of 10 to 100 nm.

16. The aqueous ink according to claim 14, wherein at least one of the kinds of carbon black has a DBP absorption amount of at least 170 cm$^3$/100 g or more and an average particle diameter of 10 to 100 nm.

17. The aqueous ink according to claim 2, comprising two kinds of carbon black between which the difference in the primary particle diameter is 1 nm or more.

18. The aqueous ink according to claim 2, comprising two kinds of carbon black between which the difference in the specific surface area is 10 m$^2$/g or more.

19. The aqueous ink according to claim 1, wherein one carbon black has a DBP absorption amount of 40 cm$^3$/100 g or more and less than 100 cm$^3$/100 g and the other carbon black has a DBP absorption amount of 100 to 400 m$^3$/100 g.

20. The aqueous ink according to claim 1, wherein the compounding ratio by weight of the two types of carbon black is 95/5 to 5/95.

21. The aqueous ink according to claim 19, wherein the compounding ratio by weight of the two types of carbon black is 95/5 to 5/95.

22. The aqueous ink according to claim 19, comprising carbon black having a DBP absorption amount of at least 170 cm$^3$/100 g or more.

23. The aqueous ink according to claim 20, comprising carbon black having a DBP absorption amount of at least 170 cm$^3$/100 g or more.

24. The aqueous ink according to claim 21, comprising carbon black having a DBP absorption amount of at least 170 cm$^3$/100 g or more.

25. The aqueous ink according to claim 19, wherein at least one of the kinds of carbon black has a DBP absorption amount of at least 170 cm$^3$/100 g or more and an average particle diameter of 10 to 100 nm.

26. The aqueous ink according to claim 20, wherein at least one of the kinds of carbon black has a DBP absorption amount of at least 170 cm$^3$/100 g or more and an average particle diameter of 10 to 100 nm.

27. The aqueous ink according to claim 21, wherein at least one of the kinds of carbon black has a DBP absorption amount of at least 170 cm$^3$/100 g or more and an average particle diameter of 10 to 100 nm.

* * * * *